Feb. 26, 1952  A. TRASK  2,587,408
SEAL
Filed Jan. 19, 1946
Fig.1.
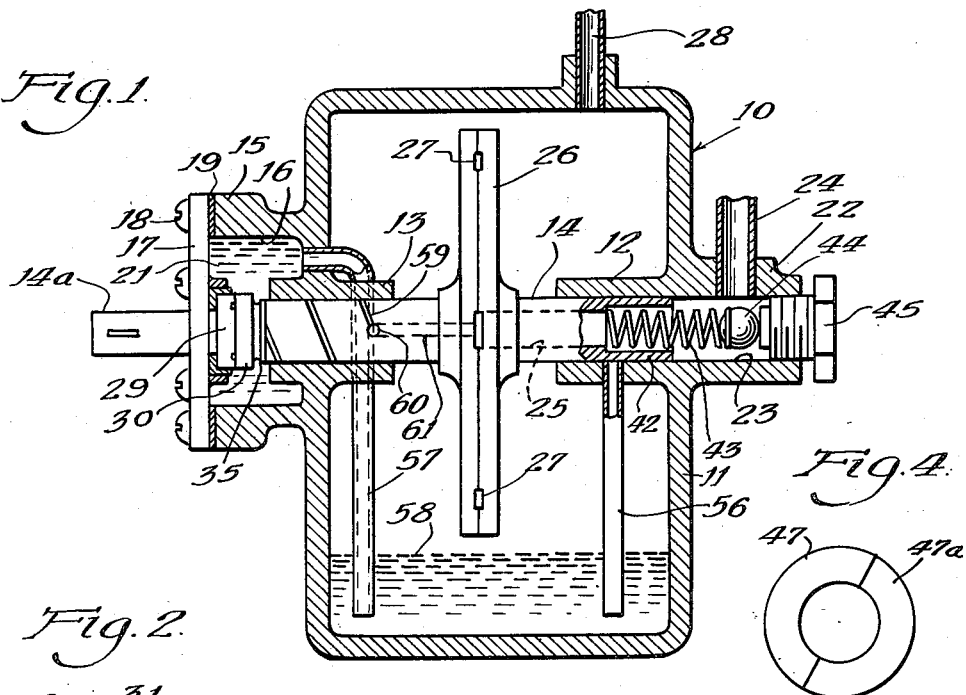
Fig.2.
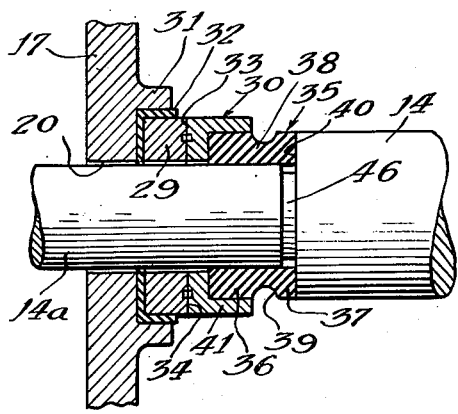
Fig.3.
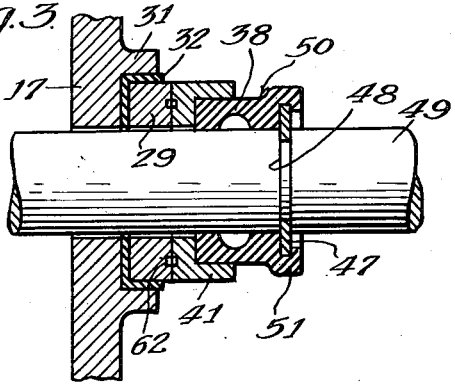
Fig.4.
Fig.5.
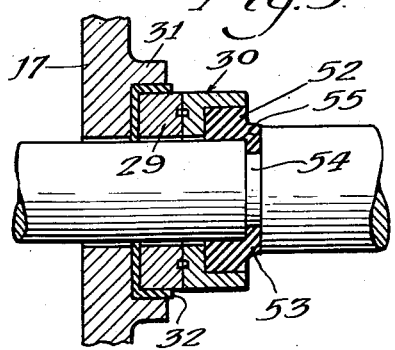
Fig.6. Fig.7.
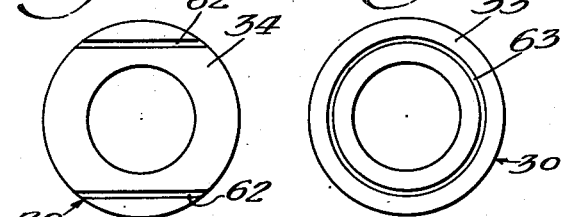
Inventor:
Allen Trask
By Zahl & Fritzbaugh
Attorneys Patented Feb. 26, 1952

2,587,408

UNITED STATES PATENT OFFICE 2,587,408

SEAL

Allen Trask, Chicago, Ill.

Application January 19, 1946, Serial No. 642,286

1 Claim. (Cl. 286—11.12)

The present invention relates to seals for use in connection with rotating shafts, particularly where such shafts pass through a wall. The invention has particular application in connection with refrigeration compressors for restraining the escape of refrigerant vapors through the space between the shaft and the perimeter of the opening through the wall.

It is an object of the present invention to provide an effective seal that has the inherent property of accurate self-alignment and one that is relatively simple, utilizing few parts that are adapted for mass production at low unit costs. The invention employs a seal ring that is held resiliently, yet securely in a fixed position on a rotatable shaft.

Other objects and advantages of the invention will become apparent from the following description and the drawings, in which Fig. 1 is a vertical sectional view through a compressor of the rotary type showing one application of the invention, portions of the view being shown in elevation;

Fig. 2 is an enlarged fragmentary sectional view through a portion only of the compressor shown in Fig. 1 and showing one embodiment of a seal forming the subject matter of the invention;

Fig. 3 is a view corresponding to Fig. 2 but showing a second embodiment of the invention;

Fig. 4 is a detail view of the locking washer shown in Fig. 3;

Fig. 5 is a view corresponding to Figs. 2 and 3 and illustrating a third embodiment of the invention;

Fig. 6 is a view showing one face of the sealing ring shown in Figs. 2, 3 and 5; and Fig. 7 is a view of the face of the shaft ring that engages and rotates on the face of the sealing ring shown in Fig. 6.

For purposes of illustration three embodiments of the invention are shown and will be described herein. It is recognized however that these embodiments may be modified without departing from the intended scope of the invention.

Referring to the drawings and particularly to Fig. 1 the invention is illustrated in connection with a compressor unit generally indicated at 10 that comprises a housing 11 that is provided in its side walls with a pair of oppositely disposed bearing members 12 and 13. A shaft 14 is journaled in these bearings 12 and 13.

Projecting outwardly from one of the walls of the housing 11 is a boss-like portion 15 that is hollow so as to provide a chamber 16. The open face of the boss-like portion 15 is covered by a cover plate 17 that is held in place by screws 18. A gasket 19 may be inserted between the cover plate and the boss-like portion 15 to effect a seal. As shown in Fig. 2 the cover plate 17 is apertured at 20, through which aperture the shaft 14 is adapted to pass. The shaft 14 is rotated by suitable power applied to the projecting end 14a of the shaft 14 in any well known manner (not shown). The chamber 16 may be filled with a suitable lubricant indicated at 21.

At the opposite side of the housing 11 is provided a second boss-like projecting portion 22 that is provided with a passage 23. An inlet pipe 24 is adapted to introduce refrigerant into this passage 23. The shaft 14 is hollow for a portion of its length as indicated at 25 so that it can receive the refrigerant from the inlet pipe 24 through passage 23. A rotor 26 is mounted on the shaft 14 and it is provided with a central chamber that is in communication with the passage 25 in the shaft 14. The details of the rotor 26 form no part of the present invention, and therefore, it is believed unnecessary herein to give any further explanation other than to state that as the rotor 26 is rotated at high velocity, refrigerant entering the central chamber thereof through the hollow shaft 25 is drawn by centrifugal force through radial passages indicated at 27 and discharged under a relatively high pressure into the interior of the housing 11. This rotor 26 and its principle of operation is fully described in my copending application Serial No. 634,650, filed December 13, 1945, now Patent No. 2,509,376. The refrigerant thus held under pressure in the housing 11 leaves the compressor through the discharge pipe 28. A suitable refrigerant for this type of unit is Freon.

At one end of the shaft where it passes through the wall 17 an effective seal must be provided to prevent escape into the atmosphere of refrigerant that may leak past the shaft and also of lubricant 21 that is contained in the chamber 16. It is this seal with which the present invention is concerned.

As best shown in Fig. 2 a sealing ring 29 and a pressure or shaft ring 30 are mounted concentrically about the shaft 14. The cover plate 17 as shown is provided with an inwardly extending annular flange 31 that is concentrically disposed with respect to the aperture 20 through which the shaft 14 passes. A resilient gasket 32 is mounted concentrically about the shaft 14 and is disposed against the inner face of the cover plate 17 and the inner walls of the annular flange portion 31. The sealing ring 29 is adapted to fit against the gasket 32 and within the walls of the annular flange 31 with the gasket firmly pressed against these walls and the face of the cover plate 17. The shaft ring 30 is of equal inner and outer diameter with respect to the sealing ring 29 and is provided with a face 33 that is adapted to rotate on a cooperating face 34 of the sealing ring 29. The shaft ring 30 is fixed with respect to the shaft 14 by means of a holding member 35, which as shown in Fig. 2 engages the shaft at its inner circumference and at one end, engages the ring 30 at the opposite end and for a part of its outer circumference, and has a groove in its outer surface adjacent the ring engaging part. This intermediate more yieldable portion is made possible in the form shown in Fig. 2 by virtue of the fact that the relative thickness of the material is reduced by the provision of the annular groove 39 provided therein.

In the form of the invention shown in Fig. 2 the projecting portion 14a of the shaft 14 has a diameter that is less than that of the central portion of the shaft so as to provide a shoulder 40 against which the shaft engaging portion 37 of the holding member 35 may abut. The ring holding portion 36 of member 35 tightly fits within a cup-like portion 41 of the shaft ring 30 so that the shaft ring 30 is fixed with respect to the holding member 35.

In the operation of the sealing device it is important that the shaft ring 30 exert a uniform pressure against the sealing ring 29 throughout the extent of the cooperating bearing faces 33 and 34. Thus it is important that proper alignment be maintained between the sealing ring 29 and the shaft ring 30. To accomplish this the holding member 35 is provided with the intermediate yieldable portion 38. Adjustment of the position of the shaft ring 30 is provided through the movement that takes place at the intermediate yieldable portion 38 in the holding member 35.

Again referring to Fig. 1 the opposite end of shaft 14 is provided with a spring seat portion 42 that is adapted to house a portion of a compression spring 43. At the opposite end of the compression spring 43 is disposed a ball 44 that is held against the spring by means of an adjustable cap 45 that closes the otherwise open end of the passage 23 in the boss-like portion 22. Thus the shaft 14 may be urged to the left (Fig. 1) by feeding the threaded cap 45 against the ball 44 so as to compress spring 43 any desired amount. This pressure applied against the shaft 14 is transmitted to the sealing member at the opposite end of the shaft so as to force the shaft ring 30 against the sealing ring 29, the latter in turn applying pressure against the gasket 32 to effect a seal. The shaft is also sealed by virtue of the fact that the shoulder 40 is urged against the resilient holding member 35.

As shown in Fig. 2 a circumferential groove 46 is provided in the shaft 14 adjacent to the shoulder 40. The purpose of this groove is to insure a square corner where the portion 14a of smaller diameter joins the central portion of the shaft having the larger diameter.

A second embodiment of the invention is illustrated in Fig. 3. The same elements making up the seal are employed, but in this embodiment a split ring 47 is mounted in a groove 48 in a shaft 49 and the holding member in this instance, which is shown at 50, is provided with a snap-on portion 51 that is adapted to grip the ring 47. In this manner the holding member 50 is secured to the shaft 49 and the need for a shoulder 40 on the shaft is eliminated. Thus in this embodiment of the invention a shaft of uniform diameter may be used, this shaft being indicated at 49 in Fig. 3 and corresponding in function with the shaft 14 that is illustrated in the first embodiment of the invention. The holding member 50 is provided with an intermediate yieldable portion 38 as previously explained and the other elements making up the assembly conform with those described in connection with the first embodiment of the invention. The split ring 47 illustrated in Fig. 3 comprises semi-circular portions 47a and 47b so that the ring is first applied to the shaft by being inserted in the groove 48 and then the holding member 50 is snapped onto the split ring 47. This ring is held together by the holding member 50 while at the same time serving to lock the holding member to the shaft.

Referring to Fig. 5 still another embodiment of the invention is shown. In this form of the invention a holding member 52 that corresponds in function with the holding members 35 and 50 is in effect an annular member that is provided with a locking flange 53. When the annular member 52 is mounted concentrically about the shaft and sealed into position the locking flange 53 drops into a groove 54 in the shaft. In this instance the shaft has a central portion of larger diameter so as to provide a shoulder 55 that operates against the holding member 52. Adjustment of the shaft ring 30 with respect to the sealing ring 29 is effected by virtue of the relatively greater yieldability of the holding member 52 in its region of smaller thickness adjacent to the locking flange 53.

Referring to Fig. 1 a pipe 56 extends downwardly from the bearing member 12 and terminates short of the bottom of the housing 11. This pipe communicates with the rotating surface of the shaft 14 in the bearing 12. A second pipe 57 extends from the chamber 16 of the boss-like portion 15 downwardly and terminates short of the bottom of the housing 11. A supply of lubricant 58 is contained in the bottom of the housing 11 and its level is normally disposed above the lower end of each of pipes 56 and 57. A helical groove 59 is disposed in the shaft 14 from a position inside the chamber 16 of the boss-like portion 15 and extends to an opening 60 that communicates with a passage 61 in the shaft 14 that terminates in the central chamber in the rotor 26. This passage 61 is thus in communication with the intake side of the compressor rotor 26 and is adapted to draw lubricant through the helical slot 59 from the chamber 16.

Referring to Figs. 6 and 7 the sealing ring 29 is provided on its face 34 with a pair of parallel grooves 62 that pass across the face 34 of the ring and are disposed at opposite sides of and at equal distances from the center of the ring. In the cooperating face 33 of the shaft ring 30 is a circular groove 63 that is disposed from the center of the ring at a distance equal to that of the grooves 62 in ring 29. As shaft ring 30 rotates against the sealing ring 29 lubricant is introduced through grooves 62 into the circular grooves 63 of the ring 30 so as to fill this circular groove and effect a seal between the matching or cooperating faces 33 and 34 of the two rings.

Seals of the general type disclosed herein are known to the art as exemplified by a patent to Karlberg No. 2,245,106, dated June 10, 1941. These known seals however, have many disadvantages which the present invention is intended to overcome.

One of the disadvantages of these prior art seals lies in the fact that the shaft seal ring is held in contact with a member corresponding to the holding member disclosed herein only by the friction introduced by the normal seal face pressure. The holding member which remains fixed relative to the shaft during rotation often slips on the shaft ring, which of course, makes the seal ineffective. The present invention provides an arrangement wherein the shaft ring is held in substantially fixed relationship to the rotating shaft in such a manner that there is no possibility of relative rotating movement therebetween.

In some instances in the case of prior seals of this general class, the self-alignment of the shaft ring with respect to the sealing ring takes place with a relative movement between the meeting faces of the shaft ring and the holding member. This is a disadvantage because this relative movement permits the admission of lubricating oil between the shaft ring and the holding member to invite creeping or rapid relative movement between these two members resulting in seal failure due to wear of the holding member. This condition of course permits fluids to leak past the seal. In the present invention, however, self-alignment of the shaft ring in relation to the sealing ring is permitted through the resilience or pliability of the holding member. This holding member may be made of synthetic rubber or such material which has shape and resilience such as to permit relative aligning movement between the shaft ring and the shaft entirely within the resilient flow of the material in the holding member while the contacting surfaces of the holding member with the shaft ring and the shaft undergo no relative movement.

The straight grooves 62 of the sealing ring 34 (Fig. 6) are in register with the annular groove 63 of the shaft ring 30. The relationship of these grooves is such that the inner edges of the straight grooves are tangent to the inner edge of the annular groove. These grooves are less than .015 inch in depth and preferably .010 inch deep. The relationship between the two rings causes lubricating oil to flow into the straight grooves as a result of the shaft ring 30, and then around the annular groove in the direction of rotation of said groove, and finally out through the opposite end of the straight grooves from which oil is entering.

It has been determined that when the depth of these grooves is less than .015 inch the oil flow through the grooves is greater in volume than if the grooves are of greater depth than are used.

The cohesion of the lubricating oils commonly used with seals of this class is effective to a depth of .010 inch, but beyond this depth its effectiveness falls off rapidly and becomes ineffective for inducing the desired rate of oil flow at depths greater than .015 inch. In operation oil adheres to the shaft ring as it rotates. The cohesion of the oil readily pulls along the .010 inch layer of oil in the grooves and oil circulation through the grooves is thus maintained constantly during rotation of the shaft. The flow of oil through the grooves in the sealing surfaces provides both lubrication and cooling. Any particles of foreign matter which may enter between the faces of the sealing ring and the shaft ring will not be able to work their way past the annular groove 63 in the shaft ring. This annular groove with its flow of oil stands as a protective mote against abrasive articles that could score the sealing surfaces and cause seal leaks if it were not for the presence of this shallow annular groove. As to details of the complete operation of the compressor 10 and its manner of lubrication, reference may be had to my copending patent application hereinbefore identified.

I claim:

A shaft sealing structure comprising a stationary annular seal ring, a rotatable annular seal ring, a shaft extending therethrough, and means for maintaining the rotatable seal ring in sealing pressure contact with the stationary seal ring, one of said seal rings having a shallow annular groove in its face contacting the other ring, and the other ring having a shallow straight groove in register substantially tangent to said annular groove in its mating seal ring.

ALLEN TRASK.

REFERENCES CITED

The following references are of record in the file of this patent:

UNITED STATES PATENTS

| Number | Name | Date |
|---|---|---|
| 664,445 | Surth | Dec. 25, 1900 |
| 1,204,063 | Pratt | Nov. 7, 1916 |
| 1,545,080 | Cooke | July 7, 1925 |
| 1,877,688 | Petersen | Sept. 13, 1932 |
| 2,192,588 | Heckert | Mar. 5, 1940 |
| 2,237,494 | McCormack | Apr. 8, 1941 |
| 2,243,227 | Stratton | May 27, 1941 |
| 2,264,983 | Karlberg | Dec. 2, 1941 |
| 2,365,351 | Matter | Dec. 19, 1944 |
| 2,397,486 | Hoertz | Apr. 2, 1946 |
| 2,422,007 | Gilbert | June 10, 1947 |

FOREIGN PATENTS

| Number | Country | Date |
|---|---|---|
| 112,879 | Germany | of 1900 |